United States Patent [19]

Ficner et al.

[11] 4,251,491
[45] Feb. 17, 1981

[54] PROCESS FOR MAKING SODIUM TRIPOLYPHOSPHATE FROM WET PROCESS PHOSPHORIC ACID

[75] Inventors: Stanley A. Ficner, Durham; Andrew J. Klanica, Cheshire; Theodore F. Korenowski, Branford, all of Conn.

[73] Assignee: Olin Corporation, New Haven, Conn.

[21] Appl. No.: 28,148

[22] Filed: Apr. 9, 1979

[51] Int. Cl.³ ............................................. C01B 25/30
[52] U.S. Cl. .................................... 423/185; 423/315
[58] Field of Search ............... 423/315, 309, 320, 185, 423/158, 167, 305

[56] References Cited

U.S. PATENT DOCUMENTS

| 3,437,434 | 4/1969 | Sproul et al. | 423/315 |
| 3,498,747 | 3/1970 | Smaltz et al. | 423/320 |

OTHER PUBLICATIONS

Chemical Abstracts 80, 17044(s).
Householder, R. and Russell, R. G., Diffusion Method for the Determination of Silicon in Inorganic Materials, Analytical Chemistry, vol. 36, p. 2279, Nov. 1964.
Bailar, Jr., J. C. et al., Comprehensive Inorganic Chemistry, vol. 2, pp. 514-518.
Kirk-Othmer, Encyclopedia of Chemical Technology, vol. 15, pp. 264 and 265.
Waggaman, W. H., Phosphoric Acid, Phosphates and Phosphatic Fertilizers, Chapter 12, pp. 174 et seq. (1952).

*Primary Examiner*—O. R. Vertiz
*Assistant Examiner*—Wayne A. Langel
*Attorney, Agent, or Firm*—William A. Simons; Thomas P. O'Day

[57] ABSTRACT

Disclosed is a process for producing sodium tripolyphosphate (STPP) with reduced amounts of silicon and magnesium impurities from wet process phosphoric acid.

12 Claims, No Drawings

PROCESS FOR MAKING SODIUM TRIPOLYPHOSPHATE FROM WET PROCESS PHOSPHORIC ACID

BACKGROUND OF THE INVENTION

1. Field of the Invention

The present invention relates to a process for making sodium tripolyphosphate with reduced amounts of magnesium and silicon impurities from wet process phosphoric acid.

2. Description of the Prior Art

Sodium tripolyphosphate (sometimes referred to hereafter as STPP) is used today in many agricultural, industrial and food applications. Specifically, it has been utilized as a fertilizer component, as a builder in synthetic detergents and as an ingredient in many foodstuffs.

STPP has been normally made by a process that includes the steps of (a) reacting a sodium compound such as soda ash ($Na_2CO_3$) or caustic (NaOH) with either wet process phosphoric acid or furnace process phosphoric acid to form a reaction mixture containing monosodium phosphate ($NaH_2PO_4$) and disodium phosphate ($Na_4HPO_4$); (b) precipitating and thereafter removing insoluble impurities from the reaction mixture; and (c) heating the reaction mixture at elevated temperatures for sufficient time to thermally decompose or calcinate the two above-named phosphate compounds into STPP ($Na_5P_3O_{10}$) and to simultaneously remove water from the reaction mixture by volatilization. It should be noted that such processes removed impurities present in the STPP feedstock strictly by precipitation.

STPP made from wet process phosphoric acid is generally less costly than STPP made from furnace process phosphoric acid because the latter type requires large amounts of thermal energy in its production. But, STPP made from the wet process generally contains greater amounts of certain impurities, particularly silicon and magnesium, which may prevent this type of STPP from being employed in certain applications. Specifically, it has been found that the presence of silicon impurities, and to a lesser degree, magnesium impurities, often may cause turbidity or cloudiness in aqueous solutions containing STPP. Thus, industries, like the food industry, which prefer clear aqueous solutions of STPP may have to employ the more expensive STPP made from furnace process acid.

Accordingly, there is a need for a better process for making STPP from wet process acid which can reduce the amount of silicon and magnesium impurities in the product. As stated above, insoluble impurities in the STPP feedstock were removed solely by precipitation techniques. As an example, see *Chemical Abstracts*, Volume 80, page 17044s. However, it has been found that these strictly precipitation methods of purification are not efficient when the silicon and magnesium levels are each from below about 100 to about 800 parts per million (ppm) by weight of the feedstock. At such levels, their presence can still cause the undesirable turbidity, but their removal cannot be effected easily by precipitation without also losing valuable amounts of phosphate compounds. Thus, it is believed that an improved process for making STPP from wet process acid must remove silicon and magnesium impurities by some method other than strictly precipitation. The process of the present invention is directed towards such a method.

BRIEF SUMMARY OF THE INVENTION

The present invention, therefore, is a process for making sodium tripolyphosphate from wet process phosphoric acid. This process includes the steps of:
  (a) reacting wet process phosphoric acid with a sodium compound and forming a reaction mixture comprising an aqueous solution of $Na_2HPO_4$ and $NaH_2PO_4$ with silicon and magnesium impurities contained therein;
  (b) adding a fluoride compound such as NaF to the reaction mixture; the amount of that fluoride compound added being sufficient so that the resulting molar ratio of F:(Si+Mg) in the reaction mixture is at least about 5:1;
  (c) precipitating a major portion of the magnesium in said reaction mixture;
  (d) separating the precipitated magnesium from the reaction mixture, thereby forming a clarified aqueous solution;
  (e) heating the clarified solution at temperatures in the range of about 400° C. to about 700° C. for sufficient time whereby,
   (i) a major portion of the combined sum of fluoride and silicon in the clarified solution is volatilized and removed from the solution; and
   (ii) a solid sodium tripolyphosphate product is produced; and
  (f) recovering the solid sodium tripolyphosphate product.

DETAILED DESCRIPTION

The process of the present invention starts by reacting wet process phosphoric acid with a sodium compound such as sodium carbonate or sodium hydroxide and forming a reaction mixture comprising an aqueous solution of monosodium phosphate ($NaH_2PO_4$) and disodium phosphate ($Na_2HPO_4$). The typical reactions involved in this step are illustrated by the following reaction equations (A) and (B) wherein $Na_2CO_3$ is employed as the sodium source:

$$2H_3PO_4 + Na_2CO_3 \rightarrow 2NaH_2PO_4 + CO_2 + H_2O \quad \text{(A)}$$

$$2NaH_2PO_4 + Na_2CO_3 \rightarrow 2Na_2HPO_4 + CO_2 + H_2O \quad \text{(B)}$$

The formation of $NaH_2PO_4$ and $Na_2HPO_4$ by reacting phosphoric acid with sodium carbonate or sodium hydroxide involves well-known chemistry and the process of the present invention may employ any and all conventional reaction parameters for carrying out this initial step. In other words, the first step of this process is not limited to any particular reaction parameters, other than the use of wet process phosphoric acid and sodium source such as $Na_2CO_3$ or NaOH as initial reactants.

Any conventional aqueous solution of wet process phosphoric acid may be utilized as a reactant for the present invention. Descriptions of such forms and how wet process phosphoric acid is made are described in detail in Waggman, W. H., *Phosphoric Acid, Phosphates and Phosphatic Fertilizers*, 2nd Edition, Chapter 12, Reinhold Publishing Corporation, New York, (1952). That chapter of Waggman is incorporated herein by reference in its entirety. Briefly, wet process phosphoric acid is usually made by digesting natural phosphate ore with sulfuric acid in an aqueous solution. Gypsum (Ca- $SO_4.2H_2O$) is produced as a by-product and is filtered from the phosphoric acid. As stated above, wet process acid contains various amounts of impurities. The usual ranges of silicon, magnesium and fluoride found in most wet process acid solutions are listed in Table A.

TABLE A

| | Parts Per Million Parts of Acid, by weight |
|---|---|
| Silicon | 50–1000 |
| Magnesium | 50–1000 |
| Fluoride | 0–300 |

The preferred phosphoric acid solutions for the present invention are aqueous solutions containing from about 15% to about 25% by weight $P_2O_5$.

The sodium compound such as $Na_2CO_3$ or NaOH employed as a reactant herein may be from a commercial source. Normally, substantially pure grades (i.e., greater than about 98% by weight) of soda ash or caustic are the preferable sources of this reactant because of the few impurities present. However, other sources of sodium such as sodium bicarbonate may be employed in carrying out the present invention.

In a preferred embodiment of the present invention, wet process phosphoric acid and sufficient $Na_2CO_3$ or NaOH are reacted in a first reaction tank to form an aqueous solution of $NaH_2PO_4$ as illustrated by equation (A), above. The molar ratio of these two reactants is preferably about 2:1. A portion of this aqueous solution containing $NaH_2PO_4$ is then transferred to a second reaction tank wherein more $Na_2CO_3$ or NaOH is added. An aqueous solution of disodium phosphate is thereby formed as illustrated by equation (B). This second reaction is also preferably carried out by having a molar ratio of about 2 moles $NaH_2PO_4$ to about 1 mole $Na_2CO_3$. Next, these two reaction mixtures are combined in a third vessel in such proportions that the molar ratio of $Na_2HPO_4$ to $NaH_2PO_4$ therein is in the range of about 1.6:1 to about 1.75:1; more preferably, from about 1.65:1 to about 1.7:1; most preferably at about 1.67:1. An aqueous solution containing $Na_2HPO_4$ and $NaH_2PO_4$ close to or at a molar ratio of about 1.67:1 will help to insure that the final STPP product contains a high percentage of STPP. These reactions and mixing are normally accomplished at relatively warm temperatures in the range of about 60° C. to about 100° C. to prevent crystallization and for ease of handling and with agitation in each mixing tank. Furthermore, it may be preferable, but not necessary, to remove any insoluble materials which are present in the reaction mixture after the wet process acid and $Na_2CO_3$ are combined.

The aqueous feedstock solution prepared by this first step normally contains about 20% to about 36% by weight $Na_2HPO_4$ and about 7% to about 15% by weight $NaH_2PO_4$. The total $P_2O_5$ content of this feedstock solution may range from about 15% to about 30% by weight, preferably from about 17% to about 27% by weight, of the solution. The pH of this solution is normally in the range of from about 6.0 to about 7.5, more preferably about 6.5 to 7.0.

The second and most important step of the present invention is the addition of a fluoride compound to this aqueous solution containing $NaH_2PO_4$ and $Na_2HPO_4$. The fluoride compound added to the reaction mixture must be capable of aiding in the precipitation of the magnesium and in the volatilization of the silicon. It has been found that NaF, HF and $Na_2SiF_6$ accomplish these functions. Also, suitable other fluoride compounds such as sodium bifluoride (NaF.HF) and the like would also accomplish these desired functions. It is preferred that the cation of the fluoride compound be preferably sodium or hydrogen in order to be compatible with the sodium cations already present in the aqueous solution. NaF is the preferred fluoride compound to be added because HF is more costly and harder to handle in commercial applications and $Na_2SiF_6$ adds silicon along with fluoride.

The exact manner of addition is not important to the invention. Preferably, the fluoride compound can be added to the third reaction tank, noted above, after the $NaH_2PO_4$ and $Na_2HPO_4$ solutions have been combined in the preferred ratio. While it is not known exactly how the fluoride compound acts in the reaction mixture, it is believed that it reacts with the silicon and magnesium present therein as to cause the magnesium to precipitate more easily and to make the silicon to become more volatile. Possible reactions between these elements are illustrated in equations (C) and (D), below, when NaF is the fluoride compound and Mg and Si are present in the form of MgO and $SiO_2$ impurities:

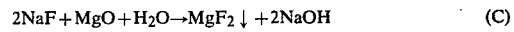
$$2NaF + MgO + H_2O \rightarrow MgF_2 \downarrow + 2NaOH \qquad (C)$$

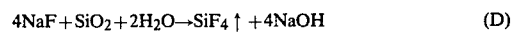
$$4NaF + SiO_2 + 2H_2O \rightarrow SiF_4 \uparrow + 4NaOH \qquad (D)$$

It is believed that the addition of fluoride compounds to this reaction mixture and the beneficial results occurring therefrom are quite surprising and unexpected. First, people skilled in the phosphoric acid and phosphate art have always been trying to remove fluoride from the products. Secondly, because the pH of this reaction mixture is above 6, it is surprising that $SiF_4$ would be volatilized.

The amount of fluoride compound added to the reaction mixture containing $NaH_2PO_4$ and $Na_2HPO_4$ has been found to be critical to the present invention. Specifically, it has been found that sufficient fluoride must be added to the reaction mixture so that the F:(Si+Mg) molar ratio in the resulting solution is at least about 5:1, more preferably in the range of about 6:1 to about 20:1, most preferably in the range of about 7:1 to about 12:1. It has been found that the addition of too little fluoride may actually cause the silicon impurities to remain in the STPP product. See the Comparison Examples and Table IV. However, the addition of too much fluoride may have the disadvantageous result of an STPP product that is low in magnesium and silicon impurities, but high in fluoride. Thus, it is preferred to limit the amount of fluoride to prevent the formation of STPP product from having too much fluoride. However, it is believed that most of the fluoride compound will volatilize as HF or $SiF_4$ during the heating step discussed below.

If the fluoride compound contains a sodium cation (e.g., NaF), then it is preferable to add additional amounts of $NaH_2PO_4$ in order to readjust the Na:P ratio in the reaction mixture to about 5:3 or close thereto. The monosodium phosphate may be added either simultaneously with the sodium fluoride, or either before or after the addition of the fluoride compound. The adjustment of Na:P molar ratio will help to insure that the % STPP in the product remains high. See the Examples 6–10 below as showing this preferred procedure.

After addition of the fluoride compound, the magnesium impurities are allowed to precipitate in the reaction mixture. The time necessary for this precipitation should be sufficient to allow a major portion (i.e., at least about 50% by weight) of the magnesium to precipitate. Preferably, the reaction mixture is heated at reflux temperatures of about 100° C. to about 120° C. for about 0.5 to about 5 hours; more preferably from about 1 to about 3 hours. It has been found that magnesium impurities in STPP have an unusual inverse solubility characteristic in that they are more insoluble at higher temperature. Under the above preferred temperature conditions, a major portion of the magnesium is easily precipitated.

When it is believed that sufficient magnesium, along with other insoluble impurities, has precipitated from the solution, then it is separated from the aqueous solution by any conventional means. Normally, filtration is the preferred method for separation; although centrifugation and decantation are other possible methods. After this separation step, a clarified aqueous solution of $Na_2HPO_4$ and $NaH_2PO_4$ is left which also contains dissolved silicon and fluoride impurities. The removed magnesium impurities may normally be discarded.

Next, this clarified aqueous solution is heated by any conventional methods at temperatures in the range of about 400° C. to about 700° C., more preferably from about 500° C. to about 550° C. The clarified solution is preferably sprayed into a calcinating furnace for a sufficient amount of time whereby two functions occur. The first function is that a major portion (i.e., at least about 50% by weight) of the combined sum of silicon and fluoride present in the clarified solution is volatilized from the solution. As stated above, the silicon is believed to be volatilized in the form of $SiF_4$ and any more excess fluoride is removed as HF gas. The second function that must occur during this step is that substantially all (i.e., at least about 95% by weight) of the water in the solution must also be volatilized while the $Na_2HPO_4$ and $NaH_2PO_4$ react to make a solid STPP product. This reaction is illustrated by the following equation (E):

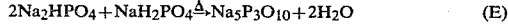

$$2Na_2HPO_4 + NaH_2PO_4 \xrightarrow{\Delta} Na_5P_3O_{10} + 2H_2O \quad (E)$$

At the reaction temperature ranges recited above, the time sufficient to cause these two results to occur is from about 1 hour to about 5 hours; more preferably from about 2 hours to about 4 hours.

In a preferred operation of the present invention, the clarified solution, after the magnesium has been precipitated and separated, is first concentrated by boiling to remove a portion of the water preferably followed by centrifugation or equivalent means to separate any solids formed by the concentration at the reflux temperature of the solution. Usually, this concentration step increases the $P_2O_5$ percent of the solution about 15-20% to about 25-30%. Next, this concentrated clarified solution is sprayed to any conventional calcinating furnace operating at the recited elevated temperatures. Such furnaces may contain crushing means or the like to make entrapped silicon and fluoride in the STPP product more susceptible to volatilization.

After the heating step, the resulting STPP product is recovered by any conventional means. Regularly, the product is immediately cooled by an air cooling or quenching step or the like. After the cooling step, the STPP product is ready to use. It may be either stored, packaged or immediately used for other applications. This product is normally a white crystalline solid having a pH of about 9.

Because of the improved process of the present invention, the product may be dissolved in water without producing a turbid or cloudy solution. Such clear aqueous solutions of STPP are very desirable in many applications including foods, household products, industrial cleaning, pulp and paper, textile processing, pharmaceuticals and the like.

The following examples further illustrate the present invention. All parts and percentages are by weight unless explicitly stated otherwise.

EXAMPLE 1

Comparison of Turbidity of STPP Solutions

A commercial STPP product made by the wet process was compared to two (2) commercial STPP products produced by two different furnace processes. All three products were dissolved in distilled water to produce 10% by weight STPP solutions. These three solutions were stirred for about one hour to insure complete dissolution of the STPP. Then, the turbidity of each solution was measured on a Klett-Summerson Colorimeter, Model 9003, by the standard method recommended by the instrument manufacturer, employing a red filter. Turbidity was measured as being the insoluble matter present in a specific amount of STPP. On the Klett-Summerson Colorimeter, distilled water alone has a turbidity value of zero and is clear by visual appearance. The results of this comparison are given in Table I.

TABLE I

| STPP Source | Klett-Summerson Turbidity Number | Visual Appearance |
|---|---|---|
| Wet Process | 55 | Turbid |
| Furnace Process (A) | 7 | Clear |
| Furnace Process (B) | 5 | Clear |

These results show that the furnace process STPP products are less turbid in aqueous solutions than STPP produced by the wet-process.

Analysis of these wet process and furnace process STPP products by conventional methods showed that wet process STPP contains much higher concentrations of magnesium, silicon and fluoride (and total insoluble matter) than furnace process STPP. The specific analysis of these STPP products are shown in Table II, below.

In particular, the concentrations of magnesium, silicon and fluoride were measured when the STPP was in dry powder form. The measurement of total insoluble matter was accomplished by making a 10% by weight solution of STPP with distilled water, separating out the insoluble matter by filtration, then drying and weighing this insoluble matter.

TABLE III

| STPP Source | Impurities in STPP (ppm) | | | Insoluble Matter (ppm) |
|---|---|---|---|---|
| | MG | Si | F | |
| Wet Process | 449 | 618 | 57 | 1900 |
| Furnace Process (A) | 13 | <10 | 4.6 | 95 |
| Furnace Process (B) | 17 | <5 | <5 | 45 |

The data in Table II shows that wet process STPP contains higher concentrations of the impurity elements: magnesium, silicon and fluoride; as compared to the two furnace process STPP products. The presence of these impurities in wet process STPP is further indicated in the high concentrations of insoluble matter 1900 ppm as compared to 95 and 45 ppm in two furnace process STPP products. Still further, the results of Table I and Table II, taken together, show that silicon and magnesium impurities in STPP made from wet process acid are a significant portion of the insoluble matter and, thus, their presence are major factors regarding the turbidity characteristics of STPP solutions.

EXAMPLE 2

A 200 gram sample of wet process phosphate feedstock that is used to make STPP was charged into a 500 milliliter stainless steel reactor equipped with a stirrer, thermometer, condenser and heating mantle. This feedstock was composed of a blend of monosodium phosphate ($NaH_2PO_4$) and disodium phosphate ($Na_2HPO_4$) in a ratio of 2 moles of the latter to 1 mole of the former. Thus, the sodium to phosphate molar ratio was 1.67:1. This feedstock contained 23.6% by weight $Na_2HPO_4$ and 9.98% by weight $NaH_2PO_4$ (whose combined total was equivalent to 17.7% by weight $P_2O_5$). The feedstock also contained 300 ppm magnesium, 217 ppm silicon and 68 ppm fluoride. Next 0.938 grams of NaF was added to the reactor. The resulting molar ratio of F:(Si+Mg) was calculated to be 5.7:1. This mixture was refluxed for 2 hours at 104° C. The mixture was then filtered to remove precipitated magnesium impurities. The filtrate was then evaporated to near dryness on a rotary flask evaporator. This concentrated filtrate was placed in a platinum crucible at 540° C. for one hour, then cooled, pulverized in a Waring blender, and reheated for 1 hour at 540° C.

The recovered STPP was pulverized and analyzed for magnesium, silicon and fluoride by standard analytical methods. The Klett-Summerson turbidity readings of a 10% aqueous STPP solution and the analysis for % STPP in the product were also determined. These results are listed in Table III, below.

EXAMPLE 3

The procedure of Example 2 was repeated except 1.250 grams of NaF were added to the reactor. The results of this Example are given in Table III.

EXAMPLE 4

The procedure of Example 3 was repeated with 1.250 grams of NaF added. The results of this Example are also given in Table III. Examples 3 and 4 taken together show reproducibility of the present invention.

EXAMPLE 5

The procedure of Example 2 was repeated except 2.500 grams of NaF were added to the reactor. The results of this experiment are given in Table III.

Comparing the results of Examples 2–5 shows that increasing amounts of NaF added causes less amounts of Si to be left in the STPP product. Moreover, the STPP products of these Examples 2–4 all showed acceptable Klett-Summerson readings for turbidity. Slightly clearer solutions of STPP were formed as the Si levels are reduced by larger NaF added amounts.

EXAMPLES 6–10

The procedure of Example 2 was repeated except 1.5 grams of NaF and 7.4 grams of monosodium phosphate ($NaH_2PO_4.H_2O$) were added to the reaction mixture. The $NaH_2PO_4.H_2O$ was added to maintain the molar ratio of Na:P in the STPP product at 1.67:1. The results of these examples are also shown in Table III.

Comparing the results of Examples 6–10 with those of Examples 2–5 shows that the % STPP in the product is increased significantly through the addition of $NaH_2PO_4.H_2O$ to the reaction mixture. The results of Examples 6–10 also show the good reproducibility of the present invention in obtaining low levels of silicon and magnesium impurities, and thus, low turbidity in aqueous STPP solutions. It can be observed that fluoride levels do not contribute significantly to turbidity.

TABLE III

| Example | NaF added grams | Resulting F:(Si + Mg) ratio | $NaH_2PO_4.H_2O$ added, grams | % STPP | STPP Analysis Mg, ppm | Si, ppm | F, ppm | Turbidity Klett-Summerson Reading |
|---|---|---|---|---|---|---|---|---|
| 2 | 0.938 | 5.7:1 | 0.0 | 96 | 15 | 139 | 50 | 9 |
| 3 | 1.250 | 7.6:1 | 0.0 | — | 15 | 151 | 23 | 12 |
| 4 | 1.250 | 7.6:1 | 0.0 | 84.1 | 12 | 72 | 24 | 7 |
| 5 | 2.500 | 15.0:1 | 0.0 | 75.2 | 28 | 50 | 245 | 1 |
| 6 | 1.500 | 9.1:1 | 7.4 | 97.5 | 16 | 90 | 245 | 6 |
| 7 | 1.500 | 9.1:1 | 7.4 | 97.5 | 11 | 83 | 110 | 4 |
| 8 | 1.500 | 9.1:1 | 7.4 | 98.5 | 12 | 64 | 140 | 4 |
| 9 | 1.500 | 9.1:1 | 7.4 | 98.5 | 10 | 49 | 36 | 2 |
| 10 | 1.500 | 9.1:1 | 7.4 | 98.1 | 13 | 76 | 23 | 1 |

EXAMPLE 11

The procedure of Example 2 was repeated except 3.6 grams of $Na_2SiF_6$ was added to the reactor instead of NaF. Furthermore, 7.4 grams of $NaH_2PO_4.H_2O$ were added to the mixture. The resulting molar ratio F:(Si+Mg) of the reaction mixture was calculated to be 4.9:1. The % STPP in the product was found to be 93.7% by weight. The STPP product was found to contain 5 ppm Mg, 65 ppm Si and 307 ppm F. A 10% aqueous STPP solution had a Klett-Summerson turbidity reading of 1.

EXAMPLE 12

A wet process phosphate feedstock similar to that employed in Examples 2–11 was employed except that feedstock contained 619 ppm Mg, 116 ppm Si and 114 ppm F. 2.5 grams of 48% hydrofluoric acid (HF) were added to this feedstock. The resulting molar ratio of F:(Si+Mg) in the feedstock was 10.3:1. The procedure of Example 2 was then repeated. The resulting STPP product was found to contain 20 ppm Mg, and 124 ppm Si. A 10% aqueous STPP solution had a Klett-Summerson turbidity reading of 6.

Examples 11 and 12 show that other fluoride compounds besides NaF are effective for reducing the levels of Mg and Si impurities.

COMPARISONS 1-4

The procedure of Example 2 was repeated except that either no NaF was added to the reactor or very small amounts of NaF were added. In these comparisons, the resulting molar ratio F:(Si+Mg) in the reaction mixture was less than about 5:1 and the amounts of Si and Mg impurities were of unacceptable levels. Aqueous solutions containing 10% STPP had high Klett-Summerson readings which indicated turbidity in the solution. The results of these Comparisons are given in Table IV, below.

TABLE IV

| Comparison | NaF added grams | Resulting F:(Si + Mg) ratio | NaH2PO4 . H2O added, grams | STPP Analysis | | | | Turbidity Klett-Summerson Reading |
|---|---|---|---|---|---|---|---|---|
| | | | | % STPP | Mg, ppm | Si, ppm | F, ppm | |
| 1 | 0.000 | 0.2:1 | 0.0 | 96 | 956 | 525 | 4 | 25 |
| 2 | 0.313 | 2.0:1 | 0.0 | — | 53 | 514 | 7 | 39 |
| 3 | 0.506 | 3.1:1 | 0.0 | 93.4 | 28 | 482 | 22 | 31 |
| 4 | 0.625 | 3.9:1 | 0.0 | — | 25 | 494 | 7 | 36 |

What is claimed is:

1. A process for producing sodium tripolyphosphate from wet process phosphoric acid comprising the steps of:
   (a) reacting said phosphoric acid with a sodium compound and forming a reaction mixture comprising an aqueous solution of $Na_2HPO_4$ and $NaH_2PO_4$ having a pH above 6 with silicon and magnesium impurities contained therein;
   (b) adding a fluoride compound to said reaction mixture; the amount of said fluoride compound added being sufficient so that the resulting molar ratio of F:(Si+Mg) in said reaction mixture is at least about 5:1;
   (c) precipitating a major portion of said magnesium in said reaction mixture;
   (d) separating said precipitated magnesium from said reaction mixture, thereby forming a clarified aqueous solution;
   (e) heating said clarified aqueous solution at temperatures in the range of about 400° C. to about 700° C. for sufficient time in order to,
   (i) volatilize and remove a major portion of the combined sum of fluoride and silicon in said clarified solution from said clarified solution; and
   (ii) form a solid sodium tripolyphosphate product; and
   (f) recovering said solid sodium tripolyphosphate product.

2. The process of claim 1 wherein said fluoride compound is NaF.

3. The process of claim 2 wherein monosodium phosphate is added with said NaF, the amount of said added monosodium phosphate being sufficient to adjust the Na:P molar ratio in said reaction mixture to about 5:3.

4. The process of claim 1 wherein the resulting F:(Si+Mg) molar ratio in step (b) is in the range from about 6:1 to about 20:1.

5. The process of claim 4 wherein the resulting F:(Si+Mg) molar ratio in step (b) is in the range of from about 7:1 to about 12:1.

6. The process of claim 1 wherein said fluoride compound is selected from the group consisting of HF, NaF, $Na_2SiF_6$ and NaF.HF.

7. The process of claim 1 wherein said heating step (e) is conducted in the temperature range from about 500° C. to about 550° C.

8. The process of claim 1 wherein said separation step (d) is a filtration step.

9. The process of claim 1 wherein precipitation step (c) is carried out at the reflux temperature of said aqueous solution.

10. The process of claim 1 wherein said clarified aqueous solution is concentrated after step (d) and before step (e) at the reflux temperature of said solution.

11. The process of claim 1 wherein said sodium compound is $Na_2CO_3$.

12. The process of claim 1 wherein said sodium compound is NaOH.

* * * * *